(12) United States Patent
Kuroki et al.

(10) Patent No.: US 9,875,856 B2
(45) Date of Patent: Jan. 23, 2018

(54) CAPACITOR

(71) Applicant: NIPPON CHEMI-CON CORPORATION, Tokyo (JP)

(72) Inventors: Takashi Kuroki, Tokyo (JP); Koji Hoshino, Tokyo (JP); Hiroyuki Wakabayashi, Tokyo (JP); Masayuki Mori, Tokyo (JP); Hideki Hashimoto, Tokyo (JP); Satoshi Tanno, Tokyo (JP)

(73) Assignee: NIPPON CHEMI-CON CORPORATION, Tokyo (JP)

( * ) Notice: Subject to any disclaimer, the term of this patent is extended or adjusted under 35 U.S.C. 154(b) by 0 days.

(21) Appl. No.: 14/962,771

(22) Filed: Dec. 8, 2015

(65) Prior Publication Data

US 2016/0093450 A1 Mar. 31, 2016

Related U.S. Application Data

(63) Continuation of application No. PCT/JP2014/003128, filed on Jun. 12, 2014.

(30) Foreign Application Priority Data

Jun. 14, 2013 (JP) ................................. 2013-125626

(51) Int. Cl.

| H01G 11/66 | (2013.01) |
|---|---|
| H01G 11/80 | (2013.01) |
| H01G 9/12 | (2006.01) |
| H01G 11/18 | (2013.01) |
| H01G 11/24 | (2013.01) |
| H01G 11/74 | (2013.01) |

(52) U.S. Cl.
CPC .............. *H01G 11/80* (2013.01); *H01G 9/12* (2013.01); *H01G 11/18* (2013.01); *H01G 11/24* (2013.01);
(Continued)

(58) Field of Classification Search
CPC .. H01G 9/12; H01G 9/10; H01G 9/04; H01G 11/24; H01G 11/66; H01G 11/80
See application file for complete search history.

(56) References Cited

U.S. PATENT DOCUMENTS

| 2006/0068276 A1 | 3/2006 | Yoo et al. |
| 2010/0149728 A1* | 6/2010 | Shimizu ................... H01G 9/12 |
| | | 361/519 |

(Continued)

FOREIGN PATENT DOCUMENTS

| CN | 103210459 A | 7/2013 |
| JP | 55-129447 U | 9/1980 |

(Continued)

OTHER PUBLICATIONS

Notification of Transmittal of the Translation of the International Preliminary Report on Patentability (Form PCT/IB/338) dated Dec. 23, 2015, with Form PCT/IB/373 and Form PCT/ISA/237, issued in counterpart International Patent Application No. PCT/JP2014/003128, with English translation. (6 pages).

(Continued)

*Primary Examiner* — Nguyen Ha
(74) *Attorney, Agent, or Firm* — Westerman, Hattori, Daniels & Adrian, LLP

(57) ABSTRACT

An aspect of a capacitor comprises an exterior package case housing an electrolyte along with a capacitor element, a sealing plate where an external terminal is disposed, the sealing plate sealing the exterior package case, a current collecting plate disposed between an electrode protruding portion formed on an element end surface of the capacitor element and the external terminal, a gas releasing mechanism disposed in the sealing plate to release a gas in the exterior package case, and a blocking mechanism disposed on at least one of the sealing plate and the current collecting plate to block the electrolyte from the gas releasing mechanism.

11 Claims, 11 Drawing Sheets

(52) U.S. Cl.
CPC ............ *H01G 11/66* (2013.01); *H01G 11/74* (2013.01); *Y02E 60/13* (2013.01)

(56) References Cited

U.S. PATENT DOCUMENTS

| | | |
|---|---|---|
| 2011/0102972 A1 | 5/2011 | Jung et al. |
| 2013/0250475 A1 | 9/2013 | Mori et al. |

FOREIGN PATENT DOCUMENTS

| | | |
|---|---|---|
| JP | 2004-22233 A | 1/2004 |
| JP | 2004-71266 A | 3/2004 |
| JP | 2011-100998 A | 5/2011 |
| JP | 2012-69644 A | 4/2012 |
| JP | 2013-26462 A | 2/2013 |
| JP | 2013-26463 A | 2/2013 |
| WO | 2012/063486 A1 | 5/2012 |

OTHER PUBLICATIONS

International Search Report dated Sep. 16, 2014, issued in counterpart application No. PCT/JP2014/003128 (1 page).
Extended European Search Report dated Mar. 22, 2017, issued in counterpart European Application No. 14811742.7. (8 pages).
Office Action dated Apr. 24, 2017, issued in counterpart Chinese Application No. 201480032071.8, with English machine translation. (14 pages).

* cited by examiner

FIG.1
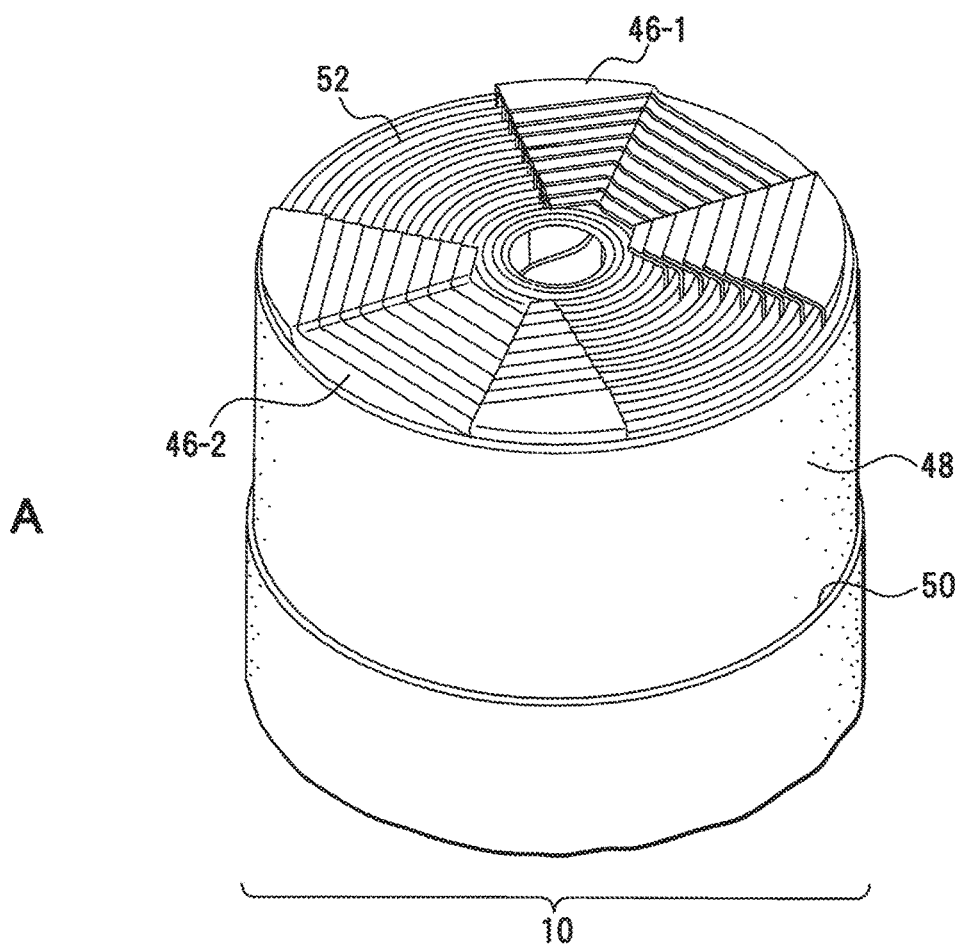
A
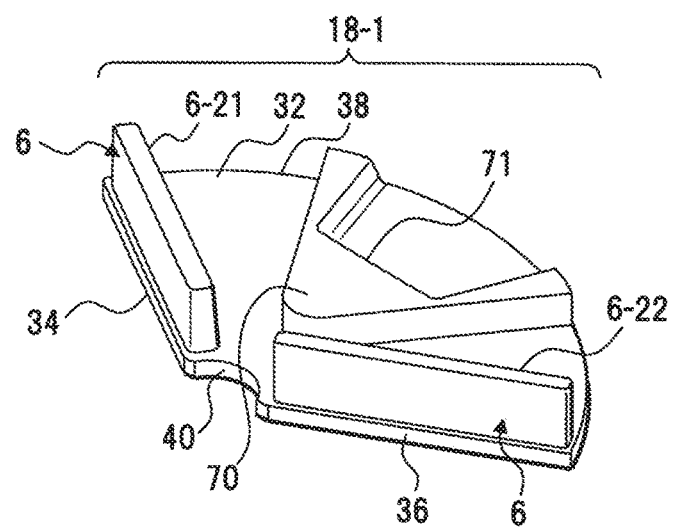
B

FIG.9
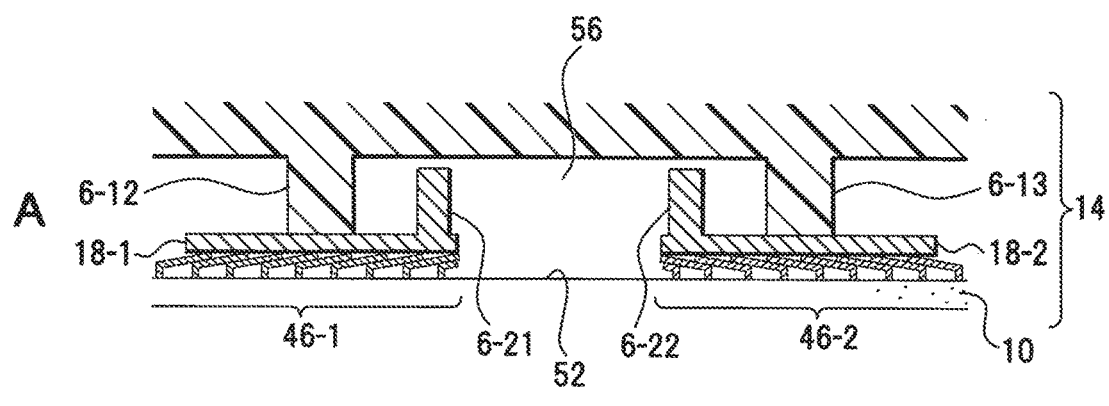
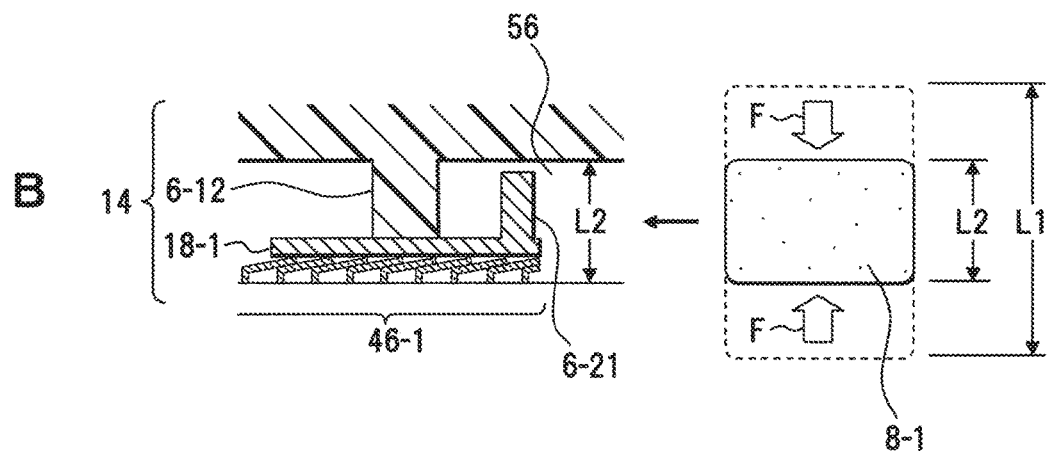

CAPACITOR

CROSS-REFERENCE TO RELATED APPLICATIONS

This application is a continuation of International Application No. PCT/JP2014/003128, filed on Jun. 12, 2014, which is entitled to the benefit of priority of Japanese Patent Application No. 2013-125626, filed on Jun. 14, 2013, the contents of which are hereby incorporated by reference.

BACKGROUND OF THE INVENTION i) Field of the Invention

A technique of this disclosure relates to a capacitor such as an electric double layer capacitor and an electrolytic capacitor.

ii) Description of the Related Art

In a capacitor such as an electric double layer capacitor and an electrolytic capacitor, an electrolyte contained in a capacitor element stays in a case. Such a capacitor includes a gas releasing mechanism. This gas releasing mechanism discharges gas accumulated in an exterior package case at the time of drive of the capacitor. For this gas releasing mechanism, for example, a safety valve with gas permeability is used.

Regarding a capacitor of this type, it is known that a Y-shaped projection is formed on a sealing plate to avoid contact of electrolytic solution leaking out at the time of operation of the safety valve with an external terminal by the projection on the sealing plate (e.g., Japanese Utility Model Application Laid-Open Publication No. 55-129447).

It is known that when a cap of a resign case is fused with a lower case by ultrasonic waves, electrolytic solution flowing out from a polarizable electrode due to vibrations is blocked by a blocking wall disposed on the cap to prevent the electrolytic solution from contaminating a fused portion (e.g., Japanese Laid-Open Patent Publication No. 2011-100998).

BRIEF SUMMARY OF THE INVENTION

A capacitor including a gas releasing mechanism such as a safety valve on a sealing plate is normally mounted with the sealing plate located on the upper side. In such a mounting form, an electrolyte staying in an exterior package case moves toward a bottom portion of the exterior package case and is therefore kept away from the safety valve of the sealing plate, and the function of the gas releasing mechanism for the electrolyte is maintained.

However, an electronic device having such a capacitor mounted thereon cannot necessarily maintain the ideal arrangement form described above for the capacitor and horizontal arrangement or tilt arrangement is inevitable depending on a mounting environment. Even when the gas releasing mechanism is away from the flowing electrolyte, the electrolyte adhering to a side surface of the exterior package case may splash up in a disposition environment accompanied by vibrations and may reduce the gas releasing function.

A predetermined amount of electrolytic solution may be enclosed in the exterior package case so as to achieve a longer life of a capacitor. The electrolytic solution enclosed in the exterior package case flows inside the capacitor.

If the electrolyte enters the gas releasing mechanism, a gas transmission path is blocked by the electrolyte. If the electrolyte adheres to a valve function portion, gas pressure is prevented from directly acting on the valve function portion. If the valve function portion is covered with the electrolyte, the valve function decreases due to deterioration in gas permeability etc., and an explosion-proof function is impaired due to a delay in valve opening in response to an abrupt increase in pressure etc.

Japanese Utility Model Application Laid-Open Publication No. 55-129447 and Japanese Laid-Open Patent Publication No. 2011-100998 do not disclose or suggest such a requirement and a problem and do not disclose or suggest a configuration etc. for solving the problem.

In view of the problem, it is therefore an object of an aspect of the present invention to prevent deterioration in gas release function due to adherence of a flowing electrolyte.

An aspect of a capacitor of this disclosure provides a capacitor having an exterior package case housing an electrolyte along with a capacitor element, a sealing plate where an external terminal is disposed, the sealing plate sealing the exterior package case, and a current collecting plate disposed between an electrode protruding portion formed on an element end surface of the capacitor element and the external terminal, the capacitor including a gas releasing mechanism disposed in the sealing plate to release a gas in the exterior package case, and a blocking mechanism disposed on at least one of the sealing plate and the current collecting plate to block the electrolyte from the gas releasing mechanism.

Other objects, features, and advantages of the present invention will become more apparent by reference to the accompanying drawings and embodiments.

BRIEF DESCRIPTION OF THE SEVERAL VIEWS OF THE DRAWING

A of FIG. 1 is a perspective view of an example of a capacitor element of an electric double layer capacitor according to a first embodiment; B of FIG. 1 is a perspective view of an example of a current collecting plate of an electric double layer capacitor according to a first embodiment.

Figure 5:
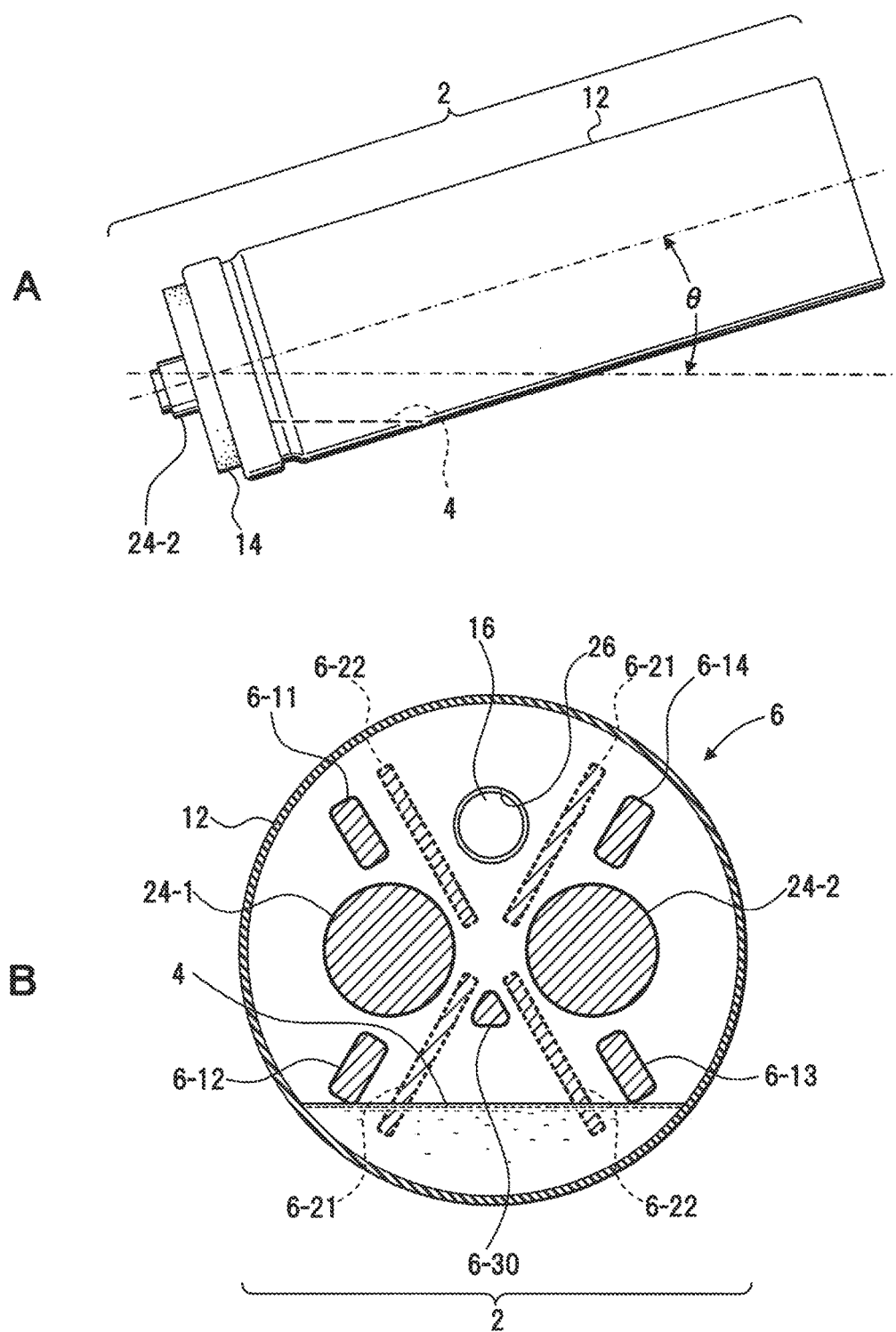
Figure 6:
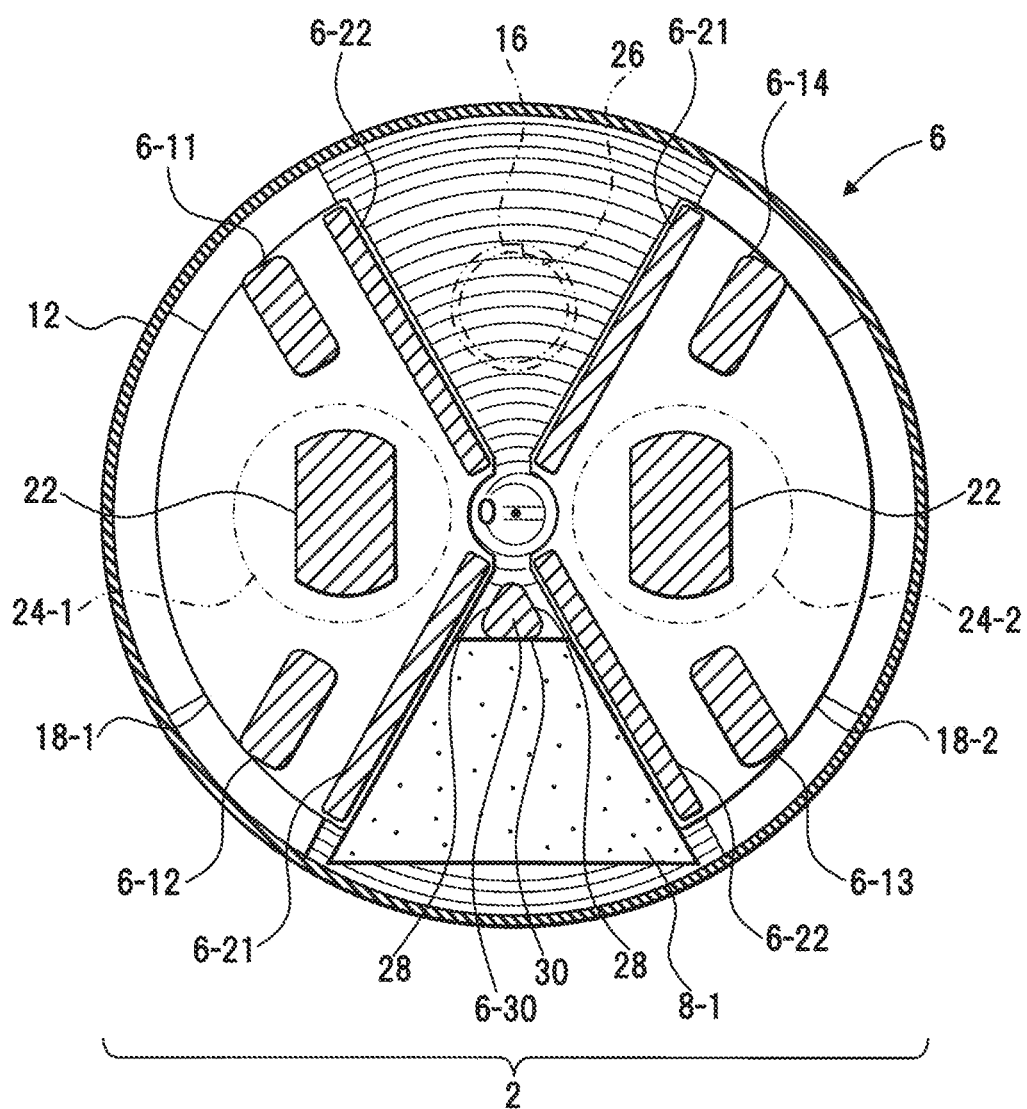
Figure 7:
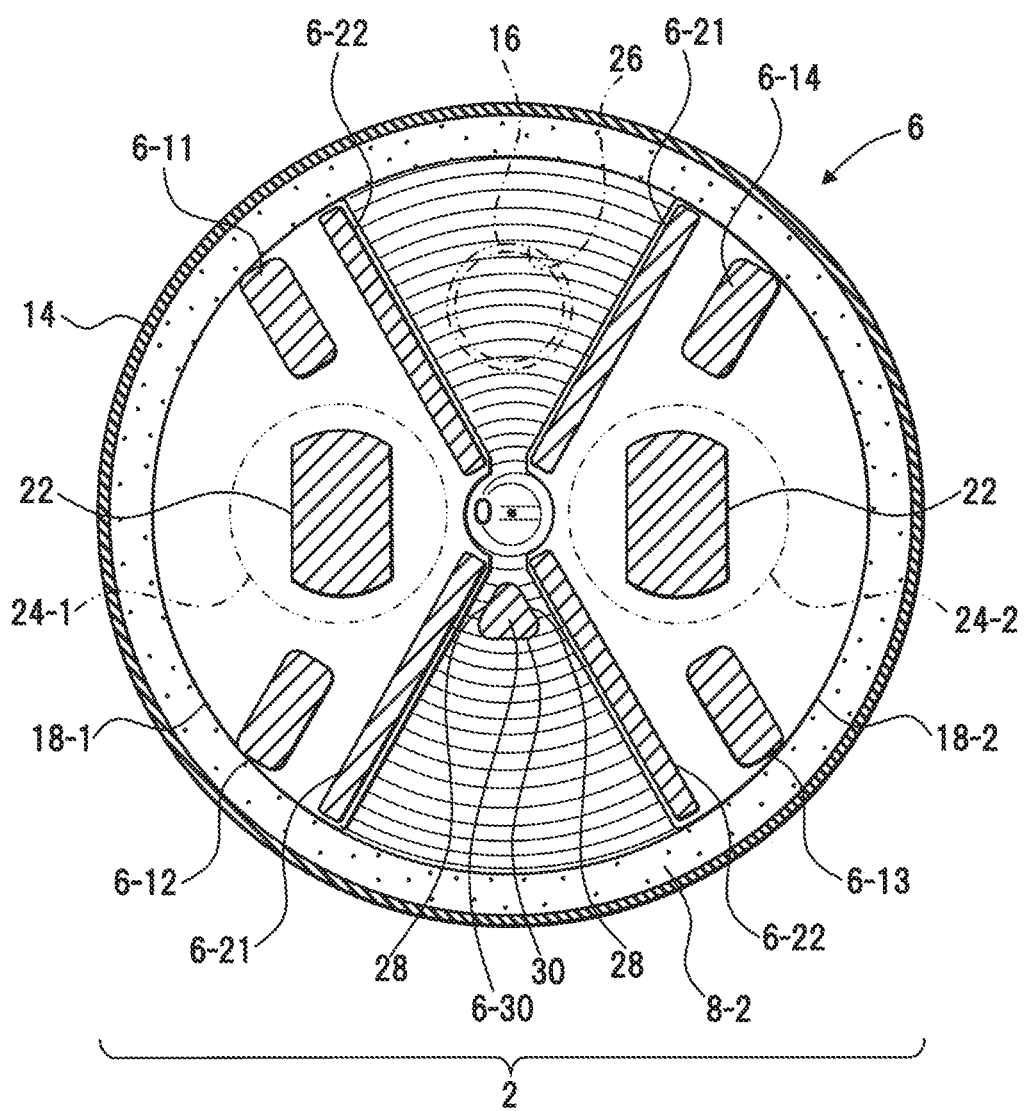
Figure 8:
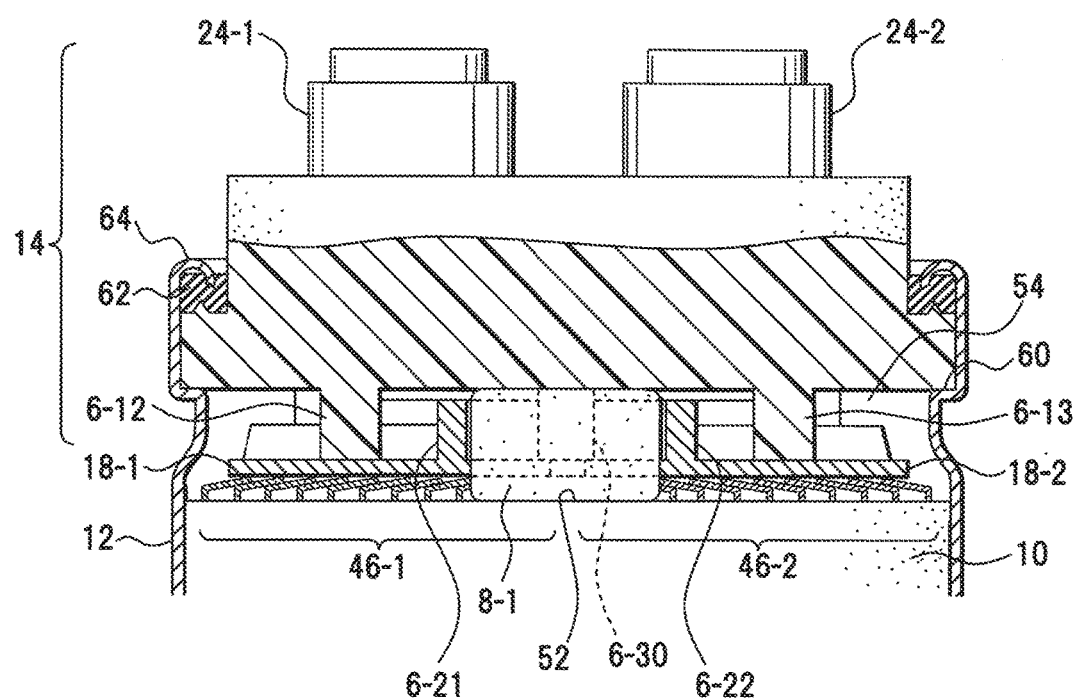
Figure 10:
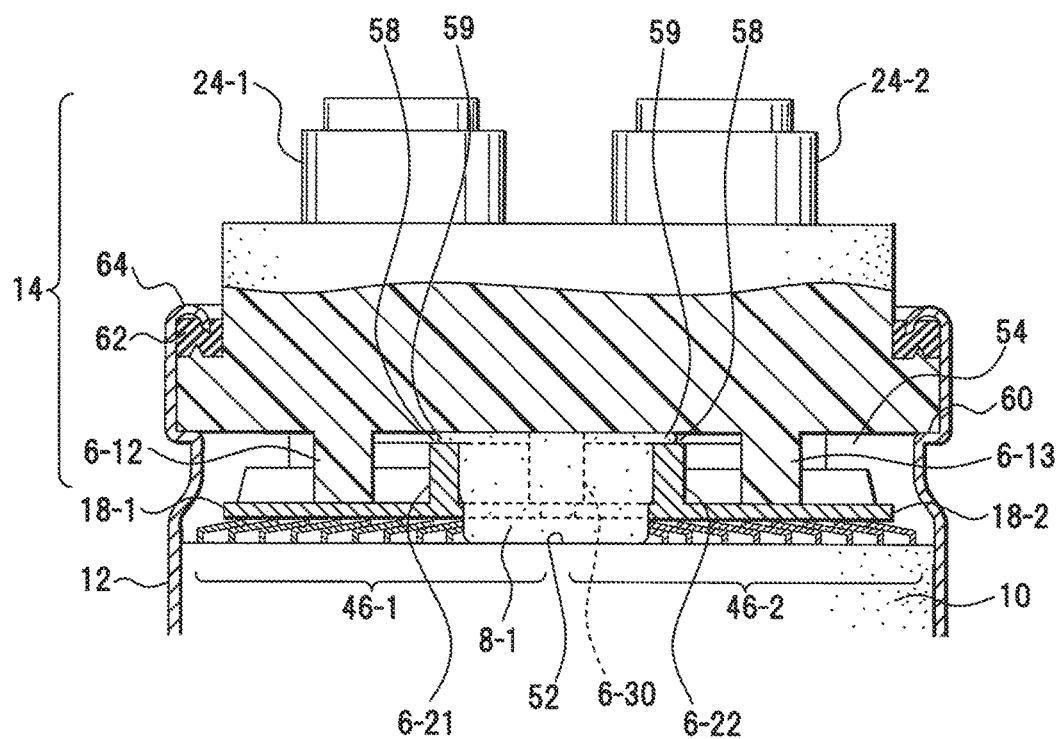
Figure 11:
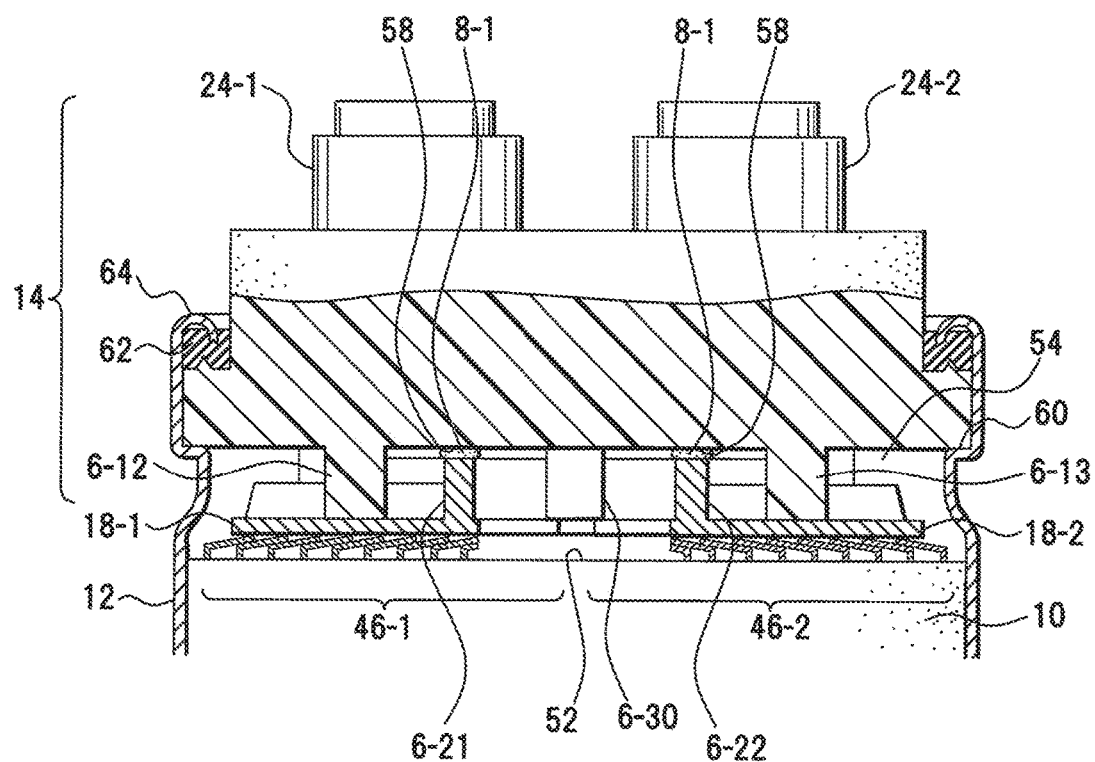

A and B of FIG. 5 are a view of a staying electrolytic solution and a blocking function for the electrolytic solution in tilt arrangement of the capacitor;

FIG. 6 is a view of an electric double layer capacitor according to a second embodiment;

FIG. 7 is a view of a variation of an electrolytic solution absorbent material;

FIG. 8 is a partial cross-sectional view of an electric double layer capacitor according to a third embodiment;

A and B of FIG. 9 are a view of an example of disposition of the electrolytic solution absorbent material to an insulation interval;

FIG. 10 is a view of another example of a disposition state of the electrolytic solution absorbent material to an insulation interval; and FIG. 11 is a view of a further example of a disposition state of the electrolytic solution absorbent material.

DETAILED DESCRIPTION OF THE INVENTION

A capacitor of the present invention includes a blocking mechanism 6 for an electrolytic solution 4 for preventing deterioration of a gas releasing function due to flowing of the electrolytic solution 4 contained in an electric double layer capacitor (hereinafter simply referred to as a "capacitor") 2 by way of example. The electrolytic solution 4 is an example of an electrolyte having fluidity. A first embodiment will be described in terms of an example of the blocking mechanism 6 and a second embodiment will be described in terms of the case that the capacitor is formed including first or second electrolytic solution absorbent material 8-1, 8-2 in addition to the blocking mechanism 6. The electrolytic solution absorbent material 8-1, 8-2 is an example of an electrolyte absorbent material. A third embodiment will be described in terms of a disposition state example of the electrolytic solution absorbent material 8-1, 8-2.

The first, second, and third embodiments will now be described with reference to examples shown in the figures.

First Embodiment

Figure 2:
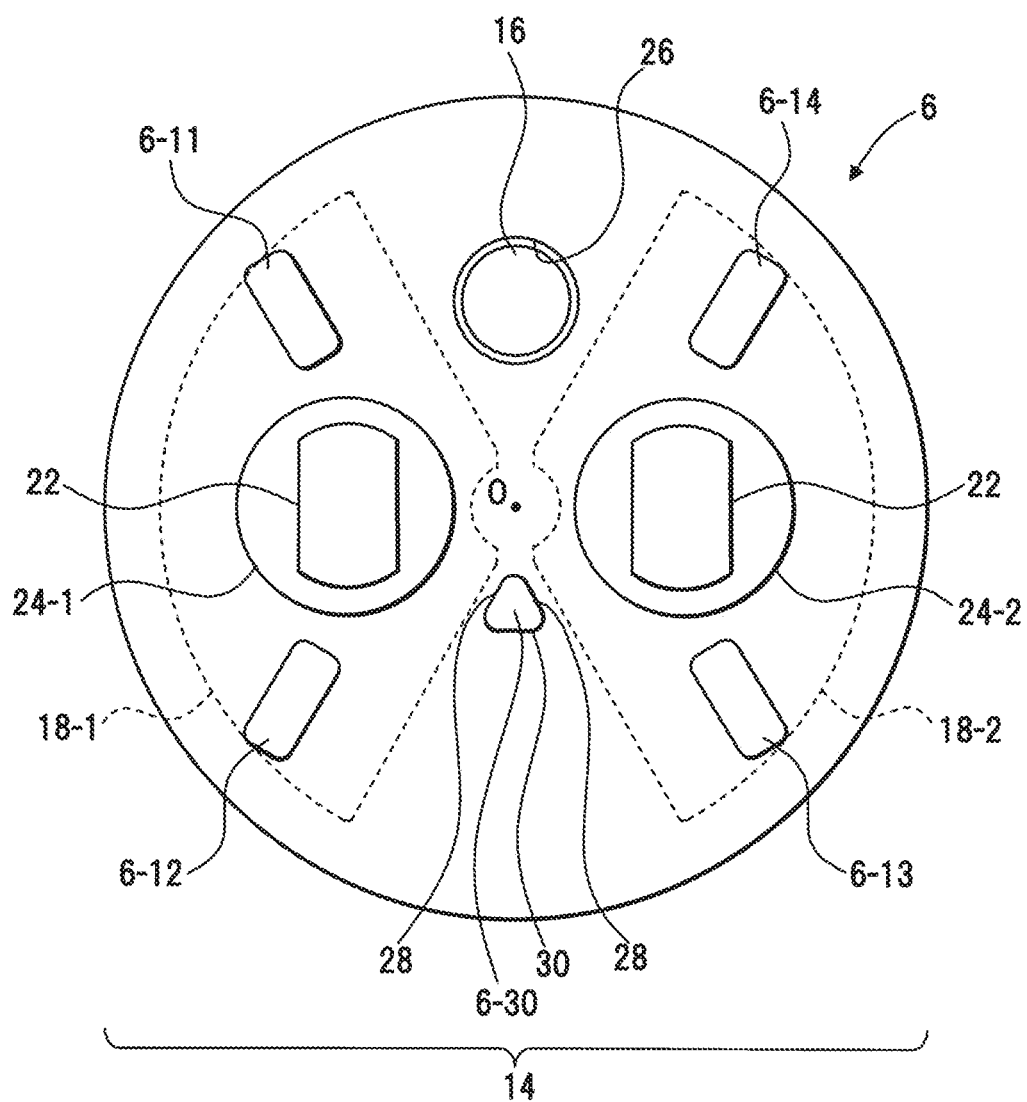
FIG. 2 is a view of an example of a sealing plate of the electric double layer capacitor according to the first embodiment.
Figure 3:
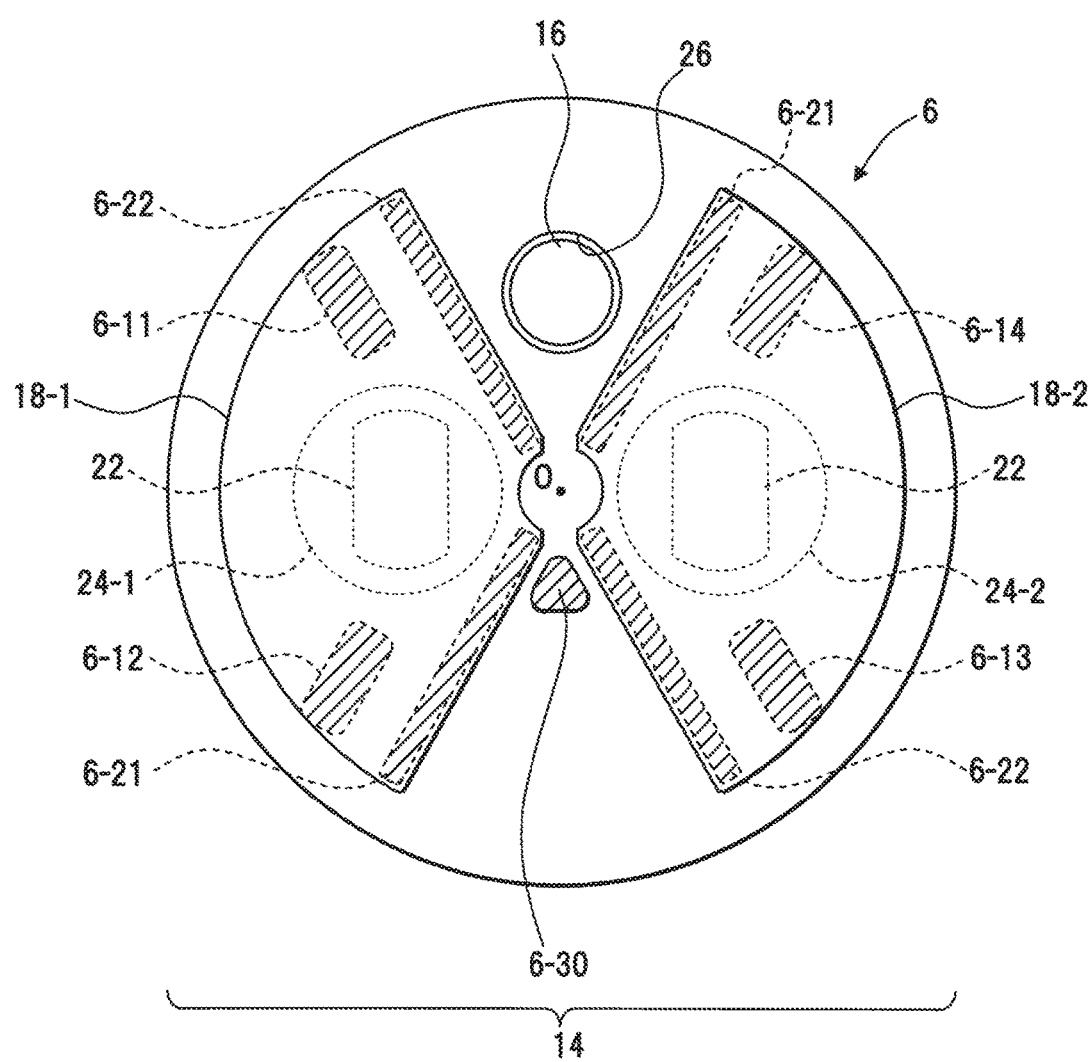
FIG. 3 is a view of arrangement of blocking walls of the sealing plate and current collecting plates.
Figure 4:
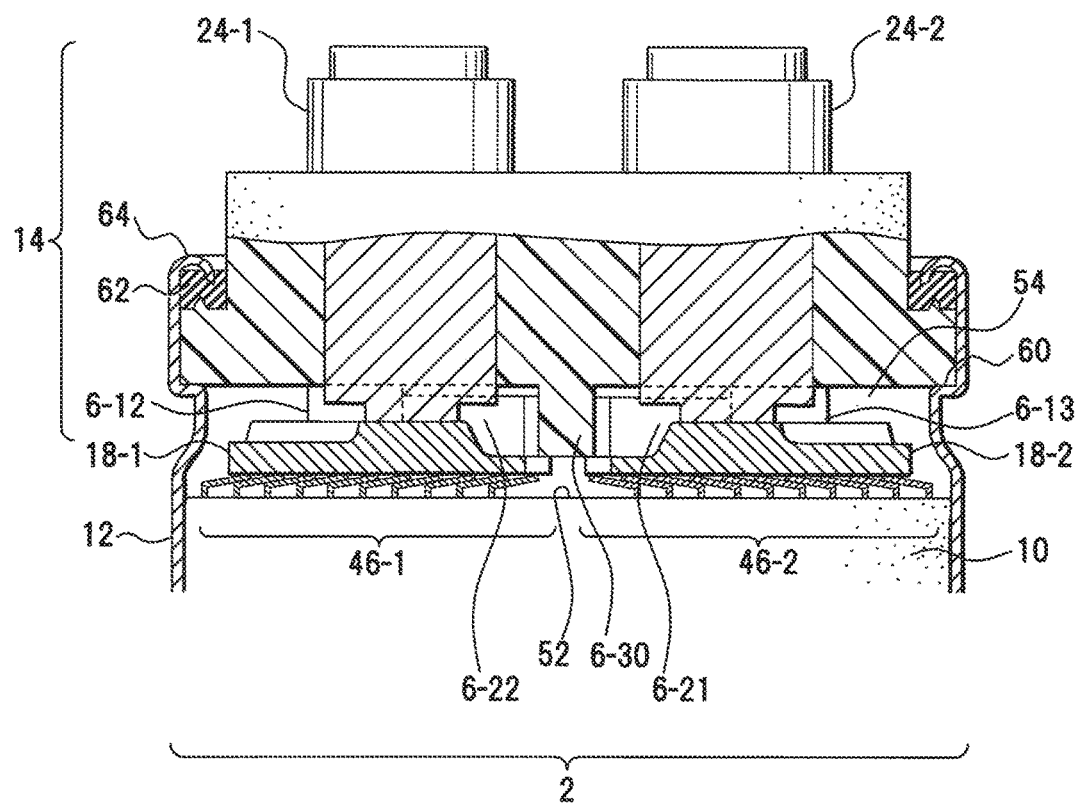
FIG. 4 is a partial cross-sectional view of a sealing portion and a current collecting portion of the electric double layer capacitor.

FIG. 1 shows an example of a current collecting plate and a capacitor element of the capacitor 2. FIG. 2 shows an example of a sealing plate. FIG. 3 shows the blocking mechanism 6 of the sealing plate and current collecting plates. FIG. 4 shows a sealing portion and a current collecting portion of the capacitor 2. FIG. 5 shows an arrangement form of the capacitor 2 and a blocking function for an electrolyte.

<Capacitor 2 and Blocking Mechanism 6>

The capacitor 2 includes a capacitor element 10, an exterior package case 12, a sealing plate 14, and current collecting plates 18-1, 18-2. The capacitor element 10 is impregnated with the electrolytic solution 4. The exterior package case 12 houses the electrolytic solution 4, the capacitor element 10, and the current collecting plates 18-1, 18-2 and is sealed by the sealing plate 14. The electrolytic solution 4 is an example of an electrolyte and has fluidity. The sealing plate 14 is provided with a safety valve 16 and this safety valve 16 is an example of a degassing valve and is also an example of a gas releasing mechanism. The sealing plate 14 is provided with first blocking walls 6-11, 6-12, 6-13, 6-14 and the current collecting plates 18-1, 18-2 are provided with second blocking walls 6-21, 6-22. Additionally, in this embodiment, the sealing plate 14 is provided with a third blocking wall 6-30. The blocking walls 6-11, 6-12, 6-13, 6-14, 6-21, 6-22, 6-30 are an example of the blocking mechanism 6 blocking the electrolytic solution 4 for the safety valve 16.

<Capacitor Element 10>

A of FIG. 1 shows a portion of the capacitor element 10. This capacitor element 10 is a winding element having respective electrode foils on the anode and cathode sides and a separator 48 overlapped and wound. This winding element is fixed by a fixing tape 50. For the electrode foils, for example, an aluminum foil is used as a base material, and polarizable electrodes containing an active material such as activated carbon, a binder, etc. are formed on the both surfaces of the aluminum foil. The capacitor element 10 has an element end surface 52 formed of an edge portion of the separator 48.

On this element end surface 52, electrode protruding portions 46-1, 46-2 on the anode side and the cathode side are formed by drawing out the edge portions of the electrode foils on the anode side and the cathode side. The electrode protruding portions 46-1, 46-2 are made up of a base member having aluminum surfaces exposed without forming the polarizable electrodes, and are formed of the edge portions of the electrode foils. In this embodiment, each of the electrode protruding portions 46-1, 46-2 is formed into a fan shape having an angle of 120 degrees with a cut made in a circular arc portion at an angle of 40 degrees, for example, and is flattened by bending each portion toward the center of the element. The element end surface 52 has an insulation interval formed on the side of the facing surfaces of the electrode protruding portion 46-1 on the anode side and the electrode protruding portion 46-2 on the cathode side. This insulation interval includes a circular central part formed in the central part of the element end surface 52 of the capacitor element 10.

<Current Collecting Plates 18-1, 18-2>

B of FIG. 1 shows the current collecting plate 18-1 on the anode side. The current collecting plate 18-1 is connected to an external terminal 24-1 on the anode side. The current collecting plate 18-2 on the cathode side is the same as the current collecting plate 18-1 and is connected to the external terminal 24-2 on the cathode side.

The current collecting plate 18-1 includes a main body portion 32. The main body portion 32 has a fan shape set to an opening angle θ=120 degrees. The main body portion 32 includes linear edge portions 34, 36 in crossing directions and includes a large-diameter circular arc portion 38 and a small-diameter circular arc portion 40 connecting the edge portions 34, 36. The circular arc portion 38 is disposed on the circumferential edge side of the capacitor element 10 and the circular arc portion 40 is disposed in the vicinity of the center of the capacitor element 10.

One surface of the main body portion 32 has a triangular convex portion 70 formed with one vertex facing toward the circular arc portion 40 of the current collecting plates 18-1. A part of the convex portion 70 closer to the circular arc portion 38 acts as a current collecting plate connecting surface portion 71 connected to a terminal connecting surface portion 22 of the external terminal 24-1.

Second blocking walls 6-21, 6-22 blocking the electrolytic solution 4 are disposed close to each of the edge portions 34, 36 of the current collecting plate 18-1. Each of the blocking walls 6-21, 6-22 is formed of a rectangular flat plate, for example. The second blocking walls 6-21, 6-22 are set equivalent to or lower than the height of a gap generated between the main body portion 32 and a rear surface of the sealing plate 14 (a surface facing the capacitor element 10) when the current collecting plate 18-1 is connected to the external terminal 24-1.

Although not shown, the current collecting plate 18-2 on the cathode side has the same shape as the current collecting plate 18-1 on the anode side.

<Sealing Plate 14>

FIG. 2 shows the rear surface of the sealing plate (the surface facing the capacitor element). The sealing plate 14 is an example of a sealing plate of the present invention. The sealing plate 14 is formed from a hard insulating synthetic resin, for example. The sealing plate 14 is provided with the external terminal 24-1 on the anode side, the external terminal 24-2 on the cathode side, the safety valve 16 acting as the gas releasing mechanism, a plurality of the first blocking walls 6-11, 6-12, 6-13, 6-14 blocking the electrolytic solution 4 (B of FIG. 5), and a third blocking wall 6-30. The first blocking walls 6-11, 6-12, 6-13, 6-14 are set equivalent to or lower than the height of a gap generated between the main body portion 32 and the rear surface of the sealing plate 14 (the surface facing the capacitor element 10) when the current collecting plates 18-1, 18-2 are connected to the external terminals 24-1, 24-2. The third blocking wall 6-30 is formed at a portion facing the insulation interval formed between the current collecting plates 18-1, 18-2 and is set to the same height as the first blocking walls 6-11, 6-12, 6-13, 6-14. Therefore, the current collecting plates 18-1, 18-2 do not exist on a surface facing the third blocking wall 6-30.

Each of the external terminals 24-1, 24-2 is formed of a metal material with good conductivity and is attached to the sealing plate 14 by insert molding. The terminal connecting surface portion 22 is formed on each of the external terminals 24-1, 24-2. The terminal connecting surface portion 22 of the external terminal 24-1 is connected to the current collecting plate 18-1 on the anode side and the terminal connecting surface portion 22 of the external terminal 24-2 is connected to the current collecting plate 18-2 on the cathode side.

The safety valve 16 is disposed in a valve hole portion 26 included in the sealing plate 14. The safety valve 16 includes, for example, a film portion having gas permeability and this film portion is disposed in the valve hole portion 26.

The third blocking wall 6-30 is disposed in the vicinity of a center O of the sealing plate 14. The third blocking wall 6-30 is, by way of example, a triangle pole body erected in the perpendicular direction relative to the rear surface of the sealing plate 14. The third blocking wall 6-30 includes a surface portion 28 parallel to the edge portion of the current collecting plate 18-1 or the current collecting plate 18-2 and a surface portion 30 in a crossing direction relative to the surface portion 28.

Each of the first blocking walls 6-11, 6-12, 6-13, 6-14 is a rectangular parallelepiped, by way of example. Each of the blocking walls 6-11, 6-12, 6-13, 6-14 is arranged in parallel with the edge portions of the current collecting plate 18-1 or the current collecting plate 18-2.

As indicated by broken lines, each of the current collecting plates 18-1, 18-2 is a fan-shaped circular arc plate having the opening angle θ=120 degrees, for example. Each of the current collecting plates 18-1, 18-2 is symmetrically arranged with the center O of the sealing plate 14, the safety valve 16, and the third blocking wall 6-30 interposed therebetween.

<Connection of Current Collecting Plates 18-1, 18-2 and Capacitor Element 10>

The electrode protruding portions 46-1, 46-2 formed on the element end surface 52 of the capacitor element 10 are connected to the current collecting plates 18-1, 18-2. The current collecting plate 18-1 on the anode side and the current collecting plate 18-2 on the cathode side are placed on the electrode protruding portion 46-1 and the electrode protruding portion 46-2, respectively, such that the surfaces without the convex portions 70 are placed on the electrode protruding portions 46-1, 46-2. In this case, the current collecting plates 18-1, 18-2 are placed such that the circular arc portions 40 meets the central part of the element without contact between the current collecting plate 18-1 and the current collecting plate 18-2. The current collecting plates 18-1, 18-2 and the electrode protruding portions 46-1, 46-2 are welded by laser irradiation from the side of the current collecting plates 18-1, 18-2 to a portion of the main body portion 32 without the convex portion 70. This laser irradiation uses an inert gas such as argon gas and helium gas for a shielding gas to shield the capacitor element 10, thereby avoiding the effect of laser heat and sputtering on the capacitor element 10.

<Connection of Current Collecting Plates 18-1, 18-2 and External Terminals 24-1, 24-2>

The current collecting plates 18-1, 18-2 connected to the capacitor element 10 are connected to the external terminals 24-1, 24-2 formed on the sealing plate 14. The external terminals 24-1, 24-2 are placed such that the terminal connecting surface portions 22 thereof are linked to the current collecting plate connecting surface portions 71 of the convex portions 70 formed on the main body portions 32 of the current collecting plates 18-1, 18-2. The terminal connecting surface portions 22 are connected to the current collecting plate connecting surface portions 71 by irradiating the periphery of placement portions of the terminal connecting surface portions 22 and the current collecting plate connecting surface portions 71 with a laser from the side of the circular arc portions 38 of the current collecting plates 18-1, 18-2. In this case, since the main body portions 32 are located between the current collecting plate connecting surface portions 71 and the circular arc portions 38, a sputter etc. generated by the laser irradiation are prevented from dropping onto the element end surface 52 of the capacitor element 10 to avoid a short circuit.

FIG. 3 shows the sealing plate 14 provided with the current collecting plates 18-1, 18-2 connected to the external terminals 24-1, 24-2.

When the current collecting plates 18-1, 18-2 are connected to the external terminals 24-1, 24-2 of the sealing plate 14, the sealing plate 14 and the current collecting plates 18-1, 18-2 form a space portion 54 (FIG. 4) corresponding to the protrusion length of the external terminals 24-1, 24-2. The space formed by the space portion 54 and the insulation interval between the current collecting plate 18-1 and the current collecting plate 18-2 is a space that may act as a movement path of the electrolytic solution 4 when the electrolytic solution 4 splashes up. As indicated by broken lines, the first blocking walls 6-11, 6-12, 6-13, 6-14 and the third blocking wall 6-30 on the side of the sealing plate 14 and the second blocking walls 6-21, 6-22 described above on the side of the current collecting plates 18-1, 18-2 are arranged in this space.

FIG. 4 shows a sealing portion of a capacitor. This capacitor 2 is an example of the capacitor of the present invention.

The capacitor 2 includes the exterior package case 12 formed from an aluminum plate. The exterior package case 12 is a matter that a metal plate of aluminum etc is formed into a bottomed cylindrical shape, for example, and is formed into a circular shape, an elliptical shape, an oval shape, or a rectangular shape in accordance with the shape of the capacitor element 10 housed therein. The capacitor element 10 has a structure in which the electrode foils on the anode and cathode sides are laminated or wound via the separator 48 and is formed into a circular shape, an elliptical shape, an oval shape, or a rectangular shape. In the first embodiment, the exterior package case 12 has a cylindrical shape.

The exterior package case 12 houses the capacitor element 10 and has the sealing plate 14 disposed on the opening portion side. The sealing plate 14 is disposed and positioned on a step portion 60 formed on the exterior package case 12, and an opening edge portion 64 of the exterior package case 12 subjected to a curling treatment is fixed to an elastic portion 62 disposed on the upper surface side of the sealing plate 14. As a result, the exterior package case 12 is sealed in a tight-seal state.

FIG. 5 shows a state of the electrolytic solution 4 in the capacitor 2 when the capacitor 2 is disposed in a tilted manner.

When the capacitor 2 is in the tilt arrangement at an angle θ, as shown in A of FIG. 5, the electrolytic solution 4 enclosed in the exterior package case 12 and the electrolytic solution 4 contained in the capacitor element 10 move in a direction orthogonal to the gravity direction. In this case, since the sealing plate 14 is on the lower side, the electrolytic solution 4 moving toward the sealing plate 14 is in contact with a portion of the sealing plate 14 as shown in B of FIG. 5.

In this case, a plurality of the blocking walls 6-11, 6-12, 6-13, 6-14, 6-21, 6-22, 6-30 is interposed between the electrolytic solution 4 and the safety valve 16. As a result, the safety valve 16 is blocked from the electrolytic solution 4.

In such a configuration, even when vibrations are applied to the capacitor 2 and the electrolytic solution 4 is shaken and splashed up, the electrolytic solution 4 is blocked by the plurality of the blocking walls 6-11, 6-12, 6-13, 6-14, 6-30, 6-21, 6-22. Therefore, the electrolytic solution 4 does not touch the safety valve 16 and the electrolytic solution 4 does not enter the valve hole portion 26. The second blocking walls 6-21, 6-22 are arranged to surround the safety valve 16, thereby achieving a structure in which the electrolytic solution 4 hardly adheres to the safety valve 16.

Effects of First Embodiment (1) The blocking walls 6-11, 6-12, 6-13, 6-14 are disposed on the sealing plate 14 while the blocking walls 6-21, 6-22 are disposed on the current collecting plates 18-1, 18-2, and these blocking walls are arranged in a separated state. The space portion 54 between the sealing plate 14 and the current collecting plates 18-1, 18-2 does not prevent the conduction of gas and the electrolytic solution 4 toward the safety valve 16 is blocked by a plurality of the blocking walls 6-11, 6-12, 6-13, 6-14, the blocking wall 6-30, and the blocking walls 6-21, 6-22. As a result, the electrolytic solution 4 adhering to the sealing plate 14 can be prevented from moving to the safety valve 16. Even when the capacitor 2 is horizontally placed or disposed with inclination and vibrations is applied to the capacitor 2 so as to splash up the electrolytic solution 4, the electrolytic solution 4 can be prevented from reaching the safety valve 16.

(2) Even if a gap is generated between the lower end surfaces of the blocking walls 6-11, 6-12, 6-13, 6-14 and the main body portions 32 of the current collecting plates 18-1, 18-2 as well as between the upper end surfaces of the blocking walls 6-21, 6-22 and the rear surface of the sealing plate 14, the blocking walls 6-11, 6-12, 6-13, 6-14 and the blocking walls 6-21, 6-22 are disposed in parallel arrangement and the electrolytic solution 4 can thereby be prevented from entering from the gap. In particular, even if a gap is generated between the upper end surfaces of the blocking walls 6-21, 6-22 and the rear surface of the sealing plate 14 and the electrolytic solution 4 enters from the gap, the blocking walls 6-11, 6-12, 6-13, 6-14 are formed toward the main body portions 32 of the current collecting plates 18-1, 18-2 to face the gap. Therefore, even when a gap is generated between the blocking walls 6-21, 6-22 and the sealing plate 14 and the electrolytic solution 4 passes through the gap, the movement of the electrolytic solution 4 toward the safety valve 16 can be restrained by the blocking walls 6-11, 6-12, 6-13, 6-14 facing the gap.

(3) The blocking wall 6-30 is disposed to close the movement path of the electrolytic solution 4 to the safety valve 16, the movement path including the space formed with the insulating interval between the current collecting plate 18-1 and the current collecting plate 18-2. Therefore, even if the capacitor 2 is disposed in a tilted manner with the sealing plate 14 located on the lower side and the safety valve 16 located on the upper side and the electrolytic solution 4 collected on the side opposite to the safety valve 16 splashes up toward the safety valve 16 due to vibrations, adherence to the safety valve 16 side can be avoided. In particular, the electrolytic solution 4 can be prevented by the blocking wall 6-30 from entering in the space formed with the insulating interval between the current collecting plate 18-1 and the current collecting plate 18-2.

(4) Since the electrolytic solution 4 does not adhere to the safety valve 16, the valve function of the safety valve 16 is not impaired. The gas discharge function and the explosion-proof function are maintained and the reliability of the capacitor 2 is retained.

(5) As shown in FIG. 3, the current collecting plates 18-1, 18-2 are formed into a fan shape and are disposed without covering the safety valve 16. In particular, the insulation interval is included at a position facing the safety valve 16 that is an example of the gas releasing mechanism and the current collecting plates 18-1, 18-2 do not exist at a position under the safety valve 16. Therefore, the current collecting plates 18-1, 18-2 are not interposed between the element end surface 52 of the capacitor element 10 and the safety valve 16 and the electrolytic solution 4 can be prevented from staying and moving through the mediation of the current collecting plates 18-1, 18-2. The function of the safety valve 16 can be prevented from deteriorating due to the electrolytic solution 4. In particular, the electrolytic solution 4 is prevented from being guided through the current collecting plates 18-1, 18-2 to the safety valve 16.

Second Embodiment

FIG. 6 shows a capacitor including a trapezoidal (trapezium) electrolytic solution absorbent material. This capacitor 2 has an electrolytic solution absorbent material 8-1 disposed between the element end surface 52 and the sealing plate 14, avoiding the disposition positions of the current collecting plates 18-1, 18-2. The electrolytic solution absorbent material 8-1 is interposed and fixed between the edge portions 34, 36 and the second blocking walls 6-21, 6-22 of the current collecting plates 18-1, 18-2 and the third blocking wall 6-30. The electrolytic solution absorbent material 8-1 may be formed of a flexible spongy or porous body. The electrolytic solution absorbent material 8-1 absorbs and retains the surplus electrolytic solution 4 staying inside the exterior package case 12.

Although the shape of the electrolytic solution absorbent material 8-1 is trapezoidal in the second embodiment, the shape is not limited to this, and the size and shape may be changed as needed depending on a desired absorbed amount of the electrolytic solution 4 and a size of the space between the current collecting plate 18-1 and the current collecting plate 18-2.

Although the current collecting plates 18-1, 18-2 and the third blocking wall 6-30 are utilized as a means for fixing the electrolytic solution absorbent material 8-1, the means is not limited to this. For example, the electrolytic solution absorbent material 8-1 may be interposed and fixed in the space portion 54 between the sealing plate 14 and the current collecting plates 18-1, 18-2 or may be fixed by using an adhesive.

<Variation>

FIG. 7 shows variation of another electrolytic solution absorbent material 8-1. This capacitor 2 has an electrolytic solution absorbent material 8-2 disposed in a surrounding manner on a peripheral edge of the sealing plate 14.

This configuration allows the surrounding electrolytic solution absorbent material 8-2 to absorb and retain the surplus electrolytic solution 4 staying inside the exterior package case 12 regardless the arrangement direction of the capacitor 2 and, therefore, the electrolytic solution 4 can be prevented from adhering to the safety valve 16. Even if the electrolytic solution 4 splashes up due to vibrations, the electrolytic solution absorbent material 8-2 disposed on the peripheral edge can reduce the level of splashing-up.

Effects of Second Embodiment (1) Since the electrolytic solution 4 collected in the exterior package case 12 is absorbed by the electrolytic solution absorbent material 8-1 or the electrolytic solution absorbent material 8-2, an amount of the splashing-up electrolytic solution 4 can be reduced as far as possible.

(2) If the capacitor 2 is disposed in the tilt arrangement (e.g., A of FIG. 5), the electrolytic solution absorbent material 8-1 can be disposed at a lower part in which the electrolytic solution 4 accumulates, so as to retain the electrolytic solution 4 in the electrolytic solution absorbent material 8-1 and to prevent the electrolytic solution 4 from splashing up. As a result the electrolytic solution 4 to the safety valve 16 can be blocked.

(3) The electrolytic solution absorbent material 8-2 can be disposed in a surrounding manner on the inner wall of the exterior package case 12 so as to absorb and retain the electrolytic solution 4 in the electrolytic solution absorbent material 8-2. Therefore, the electrolytic solution 4 can be blocked from the safety valve 16 even when the capacitor 2 is in the horizontal arrangement or the tilt arrangement or the arrangement with the safety valve 16 located on the lower side etc.

Third Embodiment

FIG. 8 shows the capacitor 2 including the electrolytic solution absorbent material 8-1. This electrolytic solution absorbent material 8-1 is disposed in an insulation interval 56 between the current collecting plates 18-1, 18-2 and is interposed and fixed at least between the facing portions of the element end surface 52 and the sealing plate 14. In particular, the electrolytic solution absorbent material 8-1 has one surface in contact with a portion of the sealing plate 14 facing toward the inside of the exterior package case 12 and the other surface side in contact with the element end surface 52 of the capacitor element 10.

In the capacitor 2, for example, as depicted in A of FIG. 9, the first blocking walls 6-12, 6-13 formed on the sealing plate 14 are in contact with a portion of the facing surface side of the current collecting plates 18-1, 18-2, and the second blocking walls 6-21, 6-22 on the current collecting plates 18-1, 18-2 are disposed inside the first blocking walls 6-12, 6-13. For example, as depicted in B of the FIG. 9, the electrolytic solution absorbent material 8-1 is inserted in the insulation interval 56 between the current collecting plate 18-1 on the anode side and the current collecting plate 18-2 on the cathode side.

A length L1 of the electrolytic solution absorbent material 8-1 is formed longer than a facing interval L2 between the element end surface 52 and the sealing plate 14 in the insulation interval 56. The length L1 of the electrolytic solution absorbent material 8-1 before disposition in the capacitor 2 is formed as a length twice longer than the facing interval L2, for example.

For example, the electrolytic solution absorbent material 8-1 is compressed by applying a predetermined compression force F in the up-down direction and inserted in the insulation interval 56. When inserted in the insulation interval 56, the electrolytic solution absorbent material 8-1 is disposed in a compressed state with a restoring force to the compression force F and is attached by pressure to the element end surface 52 and the sealing plate 14 to demonstrate the blocking function for the electrolytic solution 4.

For example, as depicted in FIG. 10, the electrolytic solution absorbent material 8-1 may partially enter a gap 58 between the sealing plate 14 and the second blocking walls 6-21, 6-22 in accordance with restoration from the compression and may form a projection portion 59. In this case, the electrolytic solution absorbent material 8-1 is interposed and fixed between both the element end surface 52 and the second blocking walls 6-21, 6-22, which are end surfaces of the current collecting plates 18-1, 18-2, and the sealing plate 14.

The projection portion 59 may be formed by a portion of the electrolytic solution absorbent material 8-1 entering inside the gap 58 depending on, for example, a horizontal length of formation of the electrolytic solution absorbent material 8-1 relative to the width of the insulation interval 56 and a ratio of the volume of the insulation interval 56 and the volume of the electrolytic solution absorbent material 8-1. The projection portion 59 has a different length entering inside the gap 58 depending on the hardness (viscosity) and the restoring characteristic of the electrolytic solution absorbent material 8-1. If the projection portion 59 is formed, side surface portions of the electrolytic solution absorbent material 8-1 is, for example, supported along the edge portions 34 (36) and the blocking walls 6-21, 6-22 of the current collecting plates 18-1, 18-2 and the projection portion 59 is engaged with the gap 58. As a result, the electrolytic solution absorbent material 8-1 is firmly fixed in the insulation interval 56.

Therefore, the capacitor 2 has the electrolytic solution absorbent material 8-1 disposed in the insulation interval 56 and the gap 58 and therefore can block the inflow of the electrolytic solution 4 to the safety valve 16.

<Variations>

(1) The electrolytic solution absorbent material 8-1 may be inserted in a compressed state only in the gap 58 between the sealing plate 14 and both the blocking wall 6-21 on the current collecting plate 18-1 and the blocking wall 6-22 on the current collecting plate 18-2. Therefore, for example, as depicted in FIG. 11, the capacitor 2 may include the electrolytic solution absorbent material 8-1 inserted between both the blocking wall 6-21 on the current collecting plate 18-1 and the blocking wall 6-22 on the current collecting plate 18-2 and the sealing plate 14. This electrolytic solution absorbent material 8-1 is disposed along the end surfaces of the blocking walls 6-21, 6-22. The electrolytic solution absorbent material 8-1 is formed longer than the height of the gap 58 and may be compressed and inserted into the gap 58. The electrolytic solution absorbent material 8-1 is interposed and fixed between the blocking walls 6-21, 6-22, which are the end surfaces of the current collecting plates 18-1, 18-2, and the sealing plate 14.

As a result, the electrolytic solution absorbent material 8-1 blocks the gap 58 between the blocking walls 6-21, 6-22 and the sealing plate 14 to prevent the surplus electrolytic solution 4 in the exterior package case 12 from flowing through the gap 58 toward the safety valve 16. Since the electrolytic solution absorbent material 8-1 is more firmly fixed by compression between the blocking walls 6-21, 6-22 and the sealing plate 14, the fixed state is maintained against impact and continuous vibrations on the capacitor 2 and the blocking function for the electrolytic solution 4 can be maintained.

(2) The inserted electrolytic solution absorbent material 8-1 of the capacitor 2 may be fixed in a compressed state at least in the gap 58 between the sealing plate 14 and both the blocking wall 6-21 of the current collecting plate 18-1 and the blocking wall 6-22 of the current collecting plate 18-2. This electrolytic solution absorbent material 8-1 is not limited to those having a quadrangular cross-sectional shape, for example, and may partially form a portion disposed between the blocking walls 6-21, 6-22 and the sealing plate 14, and the thickness of the portion may be formed longer than the height of the gap 58. In this case, the thickness of the portion of the electrolytic solution absorbent material 8-1 disposed in the insulation interval 56 may be, for example, formed equivalent to or smaller than the interval between the element end surface 52 and the sealing plate 14.

This electrolytic solution absorbent material 8-1 can block the gap 58 between the blocking walls 6-21, 6-22 and the sealing plate 14 and can absorb the electrolytic solution 4 in the insulation interval 56 to prevent the inflow toward the safety valve 16.

(3) Regarding the electrolytic solution absorbent material 8-2 depicted in FIG. 7, the electrolytic solution absorbent material 8-2 having a thickness longer than the interval between the sealing plate 14 and the element end surface 52 of the capacitor element 10 may be inserted in a compressed state in the same way.

Effects of Third Embodiment (1) Since the electrolytic solution absorbent material 8-1, 8-2 is attached by pressure and firmly fixed to the element end surface 52 and the sealing plate 14, the fixed state is maintained against impact and continuous vibrations on the capacitor 2 and the blocking function through absorption of the electrolytic solution 4 can be maintained.

(2) Since the electrolytic solution absorbent material 8-1 is compressed and inserted to close the gap 58 between the second blocking walls 6-21, 6-22 and the sealing plate 14, the electrolytic solution absorbent material 8-1 can retain the electrolytic solution 4 and can prevent the splashing-up etc. of the electrolytic solution 4 to block the inflow of the electrolytic solution 4 to the safety valve 16.

Other Embodiments

In the embodiments, an interval may be formed between the first blocking walls 6-11, 6-12, 6-13, 6-14 on the sealing plate 14 and the current collecting plates 18-1, 18-2 and between the second blocking walls 6-21, 6-22 on the current collecting plates 18-1, 18-2 and the sealing plate 14, or these walls and plates may be arranged in close contact with each other.

Although the height of the third blocking wall 6-30 on the sealing plate 14 is the same height as the other first blocking walls 6-11, 6-12, 6-13, 6-14 in the embodiments, the height is not limited to this. If the third blocking wall 6-30 is disposed at a position not facing the current collecting plates 18-1, 18-2 when the external terminals 24-1, 24-2 are connected to the current collecting plates 18-1, 18-2, the third blocking wall 6-30 may be extended to the element end surface 52 of the capacitor element 10. In this way, the path of the electrolytic solution 4 more closely passing through the center of the capacitor element 10 can be closed.

Although the shape of the current collecting plates 18-1, 18-2 is the fan shape in the embodiments, the shape is not limited to this. The shape may be semicircular or the shapes of the current collecting plate 18-1 and the current collecting plate 18-2 may be different from each other.

Although the surfaces of the convex portions 70 formed on the current collecting plates 18-1, 18-2 are utilized for the connection between the current collecting plates 18-1, 18-2 and the external terminals 24-1, 24-2, the connection is not limited to this. For example, the main body portion 32 may partially be cut out on the side of the circular arc portion 38 to form a current collecting plate connecting surface portion or the main body portion 32 may have a bent shape to make a central part higher.

Although the second blocking walls 6-21, 6-22 are disposed inside the first blocking walls 6-11, 6-12, 6-13, 6-14 in the embodiments, a disposition of the second blocking walls 6-21, 6-22 is not limited to this. The first blocking walls 6-11, 6-12, 6-13, 6-14 and the second blocking walls 6-21, 6-22 may be disposed at different positions. It is only necessary to avoid overlap between the first blocking walls 6-11, 6-12, 6-13, 6-14 and the second blocking walls 6-21, 6-22, and the first blocking walls 6-11, 6-12, 6-13, 6-14 may be disposed inside the second blocking walls 6-21, 6-22.

Although the electrode protruding portion 46-1 on the anode side and the electrode protruding portion 46-2 on the cathode side are formed on the one element end surface 52 of the capacitor element 10 in the embodiments, formations of the electrode protruding portions 46-1, 46-2 are not limited to this, and the electrode protruding portion on the anode side and the electrode protruding portion on the cathode side may be formed on different element end surfaces.

Although the safety valve 16 is used as the gas releasing mechanism in the embodiments, the gas releasing mechanism is not limited to this. For example, a through-hole may be formed in the sealing plate to dispose a gas permeable film such that the through-hole is closed, or the gas releasing mechanism may be a valve structure opening a tight-seal state when the internal pressure increases.

Although the electrolytic solution 4 having fluidity is exemplified as an example of an electrolyte in the embodiments, this electrolyte includes such an electrolyte of which fluidity is increased by applying vibration etc. at the time of drive of the capacitor 2.

Although the capacitor including the first, second, and third blocking walls as an example of the blocking mechanism 6 is exemplified in the embodiments, at least one of the first and second blocking walls may be included. The blocking mechanism 6 may be disposed on one or both of the sealing plate and the current collecting plate.

Although the long and large electrolytic solution absorbent material 8-1 is compressed and inserted between the current collecting plates 18-1, 18-2 and the sealing plate 14 in the case described in the embodiments, a process of the electrolytic solution absorbent material 8-1 is not limited to this. In a manufacturing process of the capacitor 2, for example, after the electrolytic solution absorbent material 8-1 is disposed on the element end surface 52, the sealing plate 14 and the current collecting plates 18-1, 18-2 may be connected while the electrolytic solution absorbent material 8-1 is compressed.

Aspects of a capacitor extracted from the embodiments described above are as follows.

An aspect of a capacitor provides a capacitor having an exterior package case housing an electrolyte along with a capacitor element, a sealing plate where an external terminal is disposed, the sealing plate sealing the exterior package case, and a current collecting plate disposed between an electrode protruding portion formed on an element end surface of the capacitor element and the external terminal, the capacitor comprising a gas releasing mechanism disposed in the sealing plate to release a gas in the exterior package case; and a blocking mechanism disposed on at least one of the sealing plate and the current collecting plate to block the electrolyte from the gas releasing mechanism.

In this capacitor, preferably, the blocking mechanism may include a first blocking wall erected on the sealing plate to block the electrolyte, and a second blocking wall erected on the current collecting plate to block the electrolyte, and the second blocking wall may be provided for a position different from the first blocking wall.

In this capacitor, preferably, the electrode protruding portion may be formed by protruding an electrode body on the anode side and an electrode body on the cathode side at different positions on one surface portion of the element end surface, and the current collecting plate on the anode side may be provided for the electrode protruding portion on the anode side and the current collecting plate on the cathode side may be provided for the electrode protruding portion on the cathode side.

This capacitor may preferably comprise an insulation interval between the current collecting plate on the anode side and the current collecting plate on the cathode side, and a third blocking wall blocking the electrolyte in the insulation interval.

This capacitor may preferably comprise an insulation interval at a position facing the gas releasing mechanism.

This capacitor may preferably comprise an electrolyte absorbent material absorbing the electrolyte and blocking the electrolyte from the gas releasing mechanism.

In this capacitor, preferably, the electrolyte absorbent material may be disposed in an insulation interval formed between the current collecting plate on the anode side and the current collecting plate on the cathode side.

In this capacitor, preferably, the electrolyte absorbent material may be interposed and fixed between an edge portion of the current collecting plate as well as the second blocking wall on the anode side and an edge portion of the current collecting plate as well as the second blocking wall on the cathode side.

In this capacitor, preferably, the electrolyte absorbent material may be interposed and fixed between the element end surface and/or an end surface of the current collecting plate and the sealing plate.

According to the aspects of the capacitor of the embodiments, any of the following effects is provided.

(1) Since the electrolyte splashing up due to, for example, vibrations applied to the capacitor is blocked by the blocking mechanism, the releasing function of the gas releasing mechanism is not reduced.

(2) The electrolyte in motion such as flowing or splashing up can be blocked from the gas releasing mechanism even when the capacitor is arranged in the horizontal arrangement or the tilt arrangement or even when the capacitor is accompanied by vibrations regardless of an arrangement form so as to prevent function deterioration of the gas releasing mechanism due to adherence of electrolyte.

(3) Since the function deterioration of the gas releasing mechanism can be prevented, the reliability of the capacitor is improved and the reliability can be maintained.

As described above, preferable embodiments etc. of the invention of this disclosure have been described. The invention of this disclosure is not limited by the above description and explanation. On the basis of the spirit of the invention described in claims or the spirit of the invention disclosed in the description of embodiments, various modifications and alterations can be made by those skilled in that art and these modifications and alterations obviously fall within the scope of the present invention.

Since the gas releasing mechanism such as a safety valve is included in the sealing plate sealing the exterior package case enclosing the capacitor element, and the electrolyte staying in the exterior package case can be blocked from the gas releasing mechanism so as to prevent deterioration of the valve function of the gas releasing mechanism due to the electrolyte, the invention of this disclosure can widely be utilized in capacitors such as electric double layer capacitors.

What is claimed is:

1. A capacitor having an exterior package case housing an electrolyte along with a capacitor element, a sealing plate where an external terminal is disposed, the sealing plate sealing the exterior package case, and a current collecting plate disposed between an electrode protruding portion formed on an element end surface of the capacitor element and the external terminal, the capacitor comprising:
   a gas releasing mechanism disposed in the sealing plate to release a gas in the exterior package case; and
   a blocking mechanism disposed on at least one of the sealing plate and the current collecting plate to block the electrolyte from the gas releasing mechanism, wherein
   the blocking mechanism is disposed in a space portion formed between the sealing plate and the current collecting plate.

2. The capacitor according to claim 1, wherein
   the blocking mechanism includes
   a first blocking wall erected on the sealing plate to block the electrolyte, and
   a second blocking wall erected on the current collecting plate to block the electrolyte, and wherein
   the second blocking wall is provided for a position different from the first blocking wall.

3. The capacitor according to claim 2, the capacitor comprising an electrolyte absorbent material absorbing the electrolyte and blocking the electrolyte from the gas releasing mechanism.

4. The capacitor according to claim 1, wherein
   the electrode protruding portion is formed by protruding an electrode body on the anode side and an electrode body on the cathode side at different positions on one surface portion of the element end surface, and wherein
   the current collecting plate on the anode side is provided for the electrode protruding portion on the anode side and the current collecting plate on the cathode side is provided for the electrode protruding portion on the cathode side.

5. The capacitor according to claim 4, the capacitor comprising an insulation interval between the current collecting plate on the anode side and the current collecting plate on the cathode side, and a third blocking wall blocking the electrolyte in the insulation interval.

6. The capacitor according to claim 4, the capacitor comprising an insulation interval between the current collecting plate on the anode side and the current collecting plate on the cathode side, wherein
   the gas releasing mechanism is provided for a position facing the insulation interval.

7. The capacitor according to claim 4, the capacitor comprising an electrolyte absorbent material absorbing the electrolyte and blocking the electrolyte from the gas releasing mechanism.

8. The capacitor according to claim 1, the capacitor comprising an electrolyte absorbent material absorbing the electrolyte and blocking the electrolyte from the gas releasing mechanism.

9. The capacitor according to claim 8, wherein the electrolyte absorbent material is disposed in an insulation interval formed between the current collecting plate on the anode side and the current collecting plate on the cathode side.

10. The capacitor according to claim 9, wherein the electrolyte absorbent material is interposed and fixed between an edge portion of the current collecting plate as well as the second blocking wall on the anode side and an edge portion of the current collecting plate as well as the second blocking wall on the cathode side.

11. The capacitor according to claim 8, wherein the electrolyte absorbent material is interposed and fixed between the element end surface and/or an end surface of the current collecting plate and the sealing plate.

\* \* \* \* \*